(12) United States Patent
Muramatsu et al.

(10) Patent No.: US 7,818,964 B2
(45) Date of Patent: Oct. 26, 2010

(54) EXHAUST SYSTEM FOR MOTORCYCLE

(75) Inventors: Tatsuhiro Muramatsu, Hamamatsu (JP); Yoshisato Inayama, Hamamatsu (JP); Kazutatsu Suzuki, Hamamatsu (JP); Tomoaki Onagi, Hamamatsu (JP)

(73) Assignee: Suzuki Kabushiki Kaisha, Hamamatsu-Shi (JP)

( * ) Notice: Subject to any disclaimer, the term of this patent is extended or adjusted under 35 U.S.C. 154(b) by 1065 days.

(21) Appl. No.: 11/409,078

(22) Filed: Apr. 24, 2006

(65) Prior Publication Data
US 2006/0242952 A1 Nov. 2, 2006

(30) Foreign Application Priority Data
Apr. 27, 2005 (JP) ............................. 2005-129254

(51) Int. Cl.
*F02B 27/02* (2006.01)
*F01N 1/00* (2006.01)
*B62D 61/02* (2006.01)
*B62K 11/00* (2006.01)
*B62M 7/00* (2010.01)

(52) U.S. Cl. .............................. 60/324; 60/313; 60/323; 180/219

(58) Field of Classification Search ................... 60/297, 60/312–314, 323–324; 180/219; 181/255
See application file for complete search history.

(56) References Cited

U.S. PATENT DOCUMENTS

| 5,271,480 | A * | 12/1993 | Takegami | 180/309 |
| 6,644,022 | B2 * | 11/2003 | Hirota et al. | 60/297 |
| 6,761,239 | B2 * | 7/2004 | Kawamoto | 180/219 |
| 2002/0153187 | A1 * | 10/2002 | Tsukui et al. | 180/219 |

FOREIGN PATENT DOCUMENTS

JP 2004026007 A * 1/2004

* cited by examiner

*Primary Examiner*—Thomas E Denion
*Assistant Examiner*—Audrey Klasterka
(74) *Attorney, Agent, or Firm*—Oblon, Spivak, McClelland, Maier & Neustadt, L.L.P.

(57) ABSTRACT

An exhaust system for a motorcycle having an engine mounted on a front half of a body frame of the motorcycle includes a plurality of first exhaust pipes extending from exhaust ports of the engine, a collecting section at which the first exhaust pipes are collected, a second exhaust pipe including a substantially straight portion connected to a downstream side of the collecting section and disposed under a crankcase of the engine, an expansion chamber connected to a downstream side of the second exhaust pipe and located under a rear wheel suspension arranged behind the engine, an exhaust outlet disposed on a most downstream portion of the expansion chamber, and an exhaust throttle valve and an exhaust gas sensor disposed on the straight portion of the second exhaust pipe.

8 Claims, 7 Drawing Sheets

EXHAUST SYSTEM FOR MOTORCYCLE

BACKGROUND OF THE INVENTION

1. Field of the Invention

The present invention relates to an exhaust system for a motorcycle.

2. Description of the Related Art

Many of exhaust systems for motorcycles, each of which has a multicylinder engine mounted thereon, are so constructed that exhaust pipes, the number of which is equal to the number of cylinders, extending from exhaust ports of the engine are collected and integrated into one collecting pipe or portion, and an expansion chamber is connected to a downstream side thereof.

The expansion chamber has a large weight, and in a case where the expansion chamber is arranged beside or above a rear wheel as seen in an exhaust system of a general motorcycle, the expansion chamber is separated from a gravity center of the vehicle body, causing the weight to be distributed and causing the position of the gravity center of the vehicle body to be raised, which causes a fear of lowering the driving stability As disclosed in Japanese Patent Application Laid-Open No. HEI 4-266579 (Prior Art 1), Japanese Patent No. 2875267 (Prior Art 2), and Japanese Patent Application Laid-Open Publication No. HEI 8-6597 (Prior Art 3), there has been proposed an exhaust system for a motorcycle having an expansion chamber arranged under an engine. In these exhaust systems, an exhaust throttle valve for controlling a flow rate of exhaust gas, and an exhaust gas sensor (generally, an $O_2$ sensor) for detecting an exhaust gas-component are provided in the vicinity of the expansion chamber.

In the exhaust system of the Prior Art 1, the exhaust gas sensor is arranged inside the expansion chamber disposed just under the engine. Moreover, in the exhaust systems of the Prior Arts 2 and 3, the exhaust throttle valve is disposed inside the expansion chamber.

However, in a case where the exhaust gas sensor is disposed inside the expansion chamber as the exhaust system of the Prior Art 1, water vapor contained in the exhaust gas is condensed into water in the expansion chamber and hence adhered to the exhaust gas sensor when the engine is cold, which causes a problem of prohibiting the exhaust gas sensor from operating until the condensed water is vaporized along with warming up of the engine.

Further, in a case where the exhaust throttle valve is disposed inside the expansion chamber as the exhaust system of the Prior Arts 2 and 3, the exhaust throttle valve must be large, thereby causing the exhaust system to also become large-sized. Furthermore, since the expansion chamber has a large flow passage area, the exhaust pulsation weakens, and hence, a sufficient output increasing effect cannot be expected.

SUMMARY OF THE INVENTION

The present invention has been made in view of the above circumstances in the prior art and an object of the invention is to provide an exhaust system for a motorcycle capable of arranging an expansion chamber without impairing running stability, improving operating efficiency of an exhaust throttle valve and an exhaust gas sensor, and lowering the gravity center of a vehicle body without decreasing a capacity of an oil pan.

This and other objects can be achieved according to the present invention by providing, in one aspect, an exhaust system for a motorcycle having an engine mounted on a front half of a body frame of the motorcycle in a longitudinal direction thereof, the exhaust system comprising:

a plurality of first exhaust pipes extending from exhaust ports of the engine;

a collecting section at which the first exhaust pipes are collected together;

a second exhaust pipe including a substantially straight portion connected to a downstream side of the collecting section and disposed under a crankcase of the engine;

an expansion chamber connected to a downstream side of the second exhaust pipe and located under a rear wheel suspension arranged behind the engine as seen in a side view of the motorcycle body;

an exhaust outlet disposed on a most downstream portion of the expansion chamber; and an exhaust throttle valve and an exhaust gas sensor disposed on the substantially straight portion of the second exhaust pipe.

In another aspect of the present invention, there is also provided an exhaust system for a motorcycle having an engine mounted on a front half of a body frame of the motorcycle in a longitudinal direction thereof, the exhaust system comprising:

a plurality of first exhaust pipes extending from exhaust ports of an engine;

a collecting section at which the first exhaust pipes are collected together;

a second exhaust pipe including a substantially straight portion connected to a downstream side portion of the collecting section and disposed under a crankcase of the engine;

an expansion chamber connected to a downstream side of the second exhaust pipe; and an exhaust outlet disposed on the most downstream portion of the expansion chamber, wherein the substantially straight portion of the second exhaust pipe is arranged under an oil pan of the engine so as to be offset on one side in a width direction of the vehicle, a downward extending portion of the oil pan is arranged on the other side in the width direction, an exhaust throttle valve and an exhaust gas sensor are disposed within a range in which the substantially straight portion of the second exhaust pipe overlaps with the downward extending portion of the oil pan, and the expansion chamber is arranged behind the downward extending portion of the oil pan.

In preferred embodiments in the above aspects, it is desirable that the exhaust throttle valve disposed on the substantially straight portion of the second exhaust pipe is located on an upstream side of the exhaust gas sensor on the substantially straight portion.

It is also desirable that the exhaust throttle valve is disposed in a manner that a valve shaft thereof is directed along a radial direction of the second exhaust pipe, one end portion of the valve shaft on a side of the downward extending portion of the oil pan is positioned at a level lower than another end portion of the valve shaft, and the exhaust throttle valve has a driving portion located on an outer circumferential surface of the second exhaust pipe on a side opposite to the downward extending portion of the oil pan, and wherein the exhaust gas sensor is arranged in a manner that an installation axis thereof is directed along the radial direction of the second exhaust pipe, one end portion of the installation axis on a side of the downward extending portion of the oil pan is positioned at a level lower than another end of the installation axis, and the exhaust gas sensor has a sensor main body located on the outer circumferential surface of the exhaust pipe on a side opposite to the downward extending portion of the oil pan.

A catalytic converter may be provided in the expansion chamber.

According to the present invention of the structures and characters described above, since the expansion chamber is arranged at a lower position of the vehicle body at a center with respect to a longitudinal direction of the vehicle body, centralizing the weight distribution of the vehicle body can be centralized, and the gravity center of the vehicle body can be lowered. The expansion chamber can be arranged without impairing the running stability.

Further, since the exhaust throttle valve and the exhaust gas sensor are arranged just behind the collecting portion of the first exhaust pipe at a portion upstream of the expansion chamber, the working efficiency can be enhanced.

Furthermore, it is capable of arranging the engine at a lower position of the vehicle body without decreasing oil pan capacity and lowering the gravity center of the vehicle body.

The nature and further characteristic features of the present invention will be made more clear from the following descriptions made with reference to the accompanying drawings.

DESCRIPTION OF THE PREFERRED EMBODIMENT

The present invention will be described hereunder with reference to the drawings. Further, it is first to be noted that terms "upper", "lower", "right", "left" and the like terms are used herein in the illustrated state on the drawings or in generally use of a motorcycle.

Figure 1:
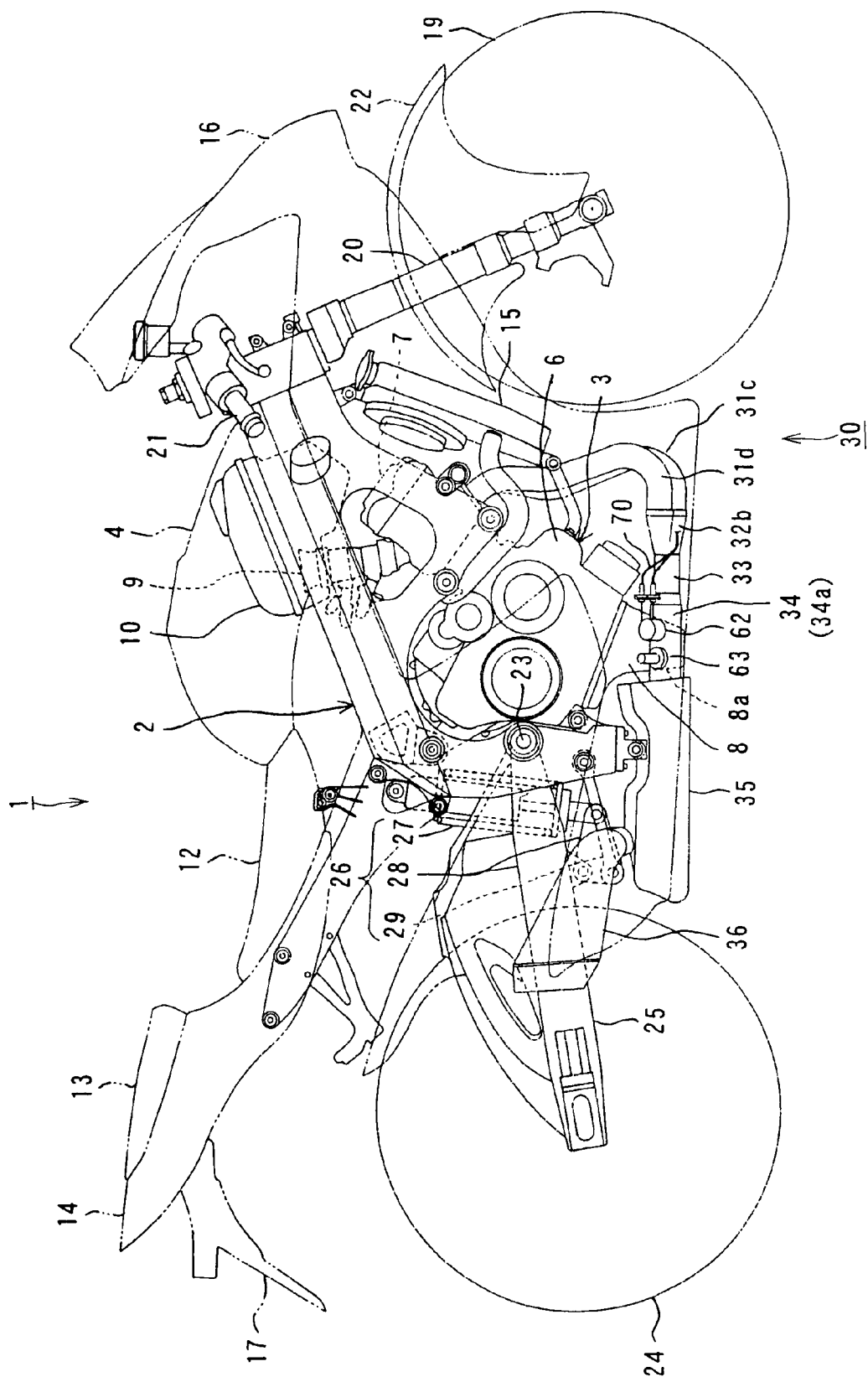
FIG. 1 is a right side view of a motorcycle to which an exhaust system according to the present invention is applied.

FIG. 1 is a right side view of a motorcycle to which an exhaust system according to an embodiment of the invention is applied. This motorcycle 1 includes a body frame 2 made of aluminum, for example, a water-cooled four-stroke in-line four cylinder engine 3 is mounted on the front half portion of the body frame 2, and a fuel tank 4 is disposed on the body frame 2 so as to be located over the engine 3.

The engine 3 includes a crankcase 6, cylinders 7 mounted on the crankcase 6 in a forward tilting manner, and an oil pan 8 arranged at a lower portion of the crankcase 6. To rear portions of the cylinders 7 is connected a fuel injection device (throttle body) and is further connected an air cleaner 10 which is arranged in a recess portion formed at a lower portion of the fuel tank 4.

A rider seat 12, a pillion 13, and a rear cowling 14 are arranged behind the fuel tank 4, and a radiator 15 is disposed in front of the cylinders 7 of the engine 3. Furthermore, a front half portion of the body frame 2 is covered with a streamlined front cowling 16 made of resin, and a rear fender 17 is disposed behind the rear cowling 14.

Front forks 20 for supporting a front wheel 19 are rotatably pivoted on a front head portion of the body frame 2 to be steered. A handle bar 21 is attached to the front head portion of the body frame 2, and a front fender 22 is attached to the front forks 20. On the other hand, a swing arm 25 for supporting a rear wheel 24 is swingably pivoted on a pivot shaft 23 installed in the width direction of the vehicle body on the central lower portion of the body frame 2, close behind the engine 3.

A rear wheel suspension 26 is constructed on a base portion of the swing arm 25 behind the engine 3. This rear wheel suspension 26 is provided with a cushion unit 27 and two links 28 and 29. The cushion unit 27 is coupled to the body frame 2 at an upper end thereof, whereas a lower end thereof is coupled to a leading end of the link 28. The link 28 is coupled to the swing arm 25 and also a rear end of the link 29, and the front end of the link 29 is coupled to the body frame 2. An up-and-down movement of the swing arm 25 is transmitted to the cushion unit 27 through the links 28 and 29, thereby causing expansion and contraction of the cushion unit 27, which absorb a swinging shock of the swing arm 25 and the rear wheel 24.

Figure 2:
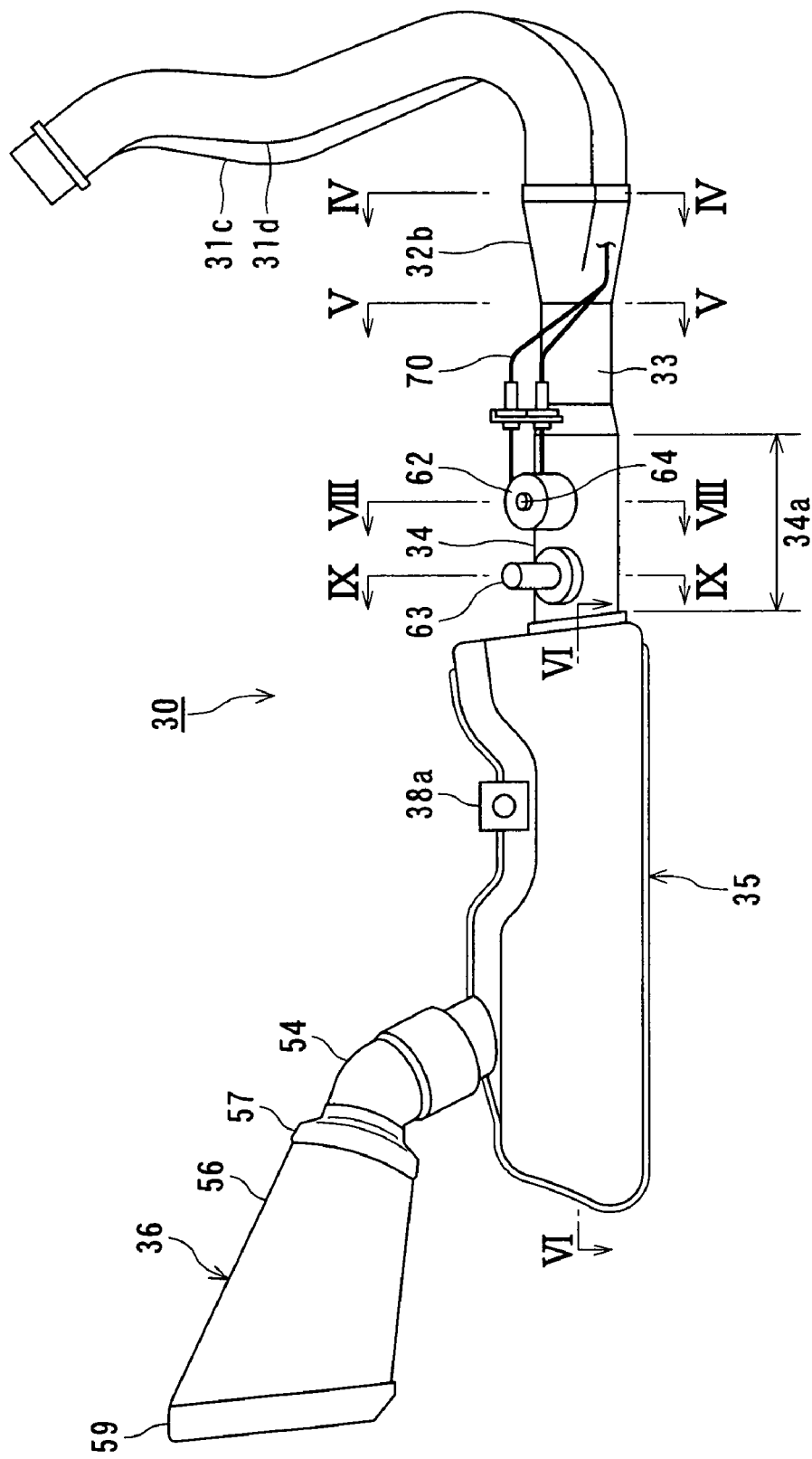
FIG. 2 is a right side view of the exhaust system.
Figure 3:
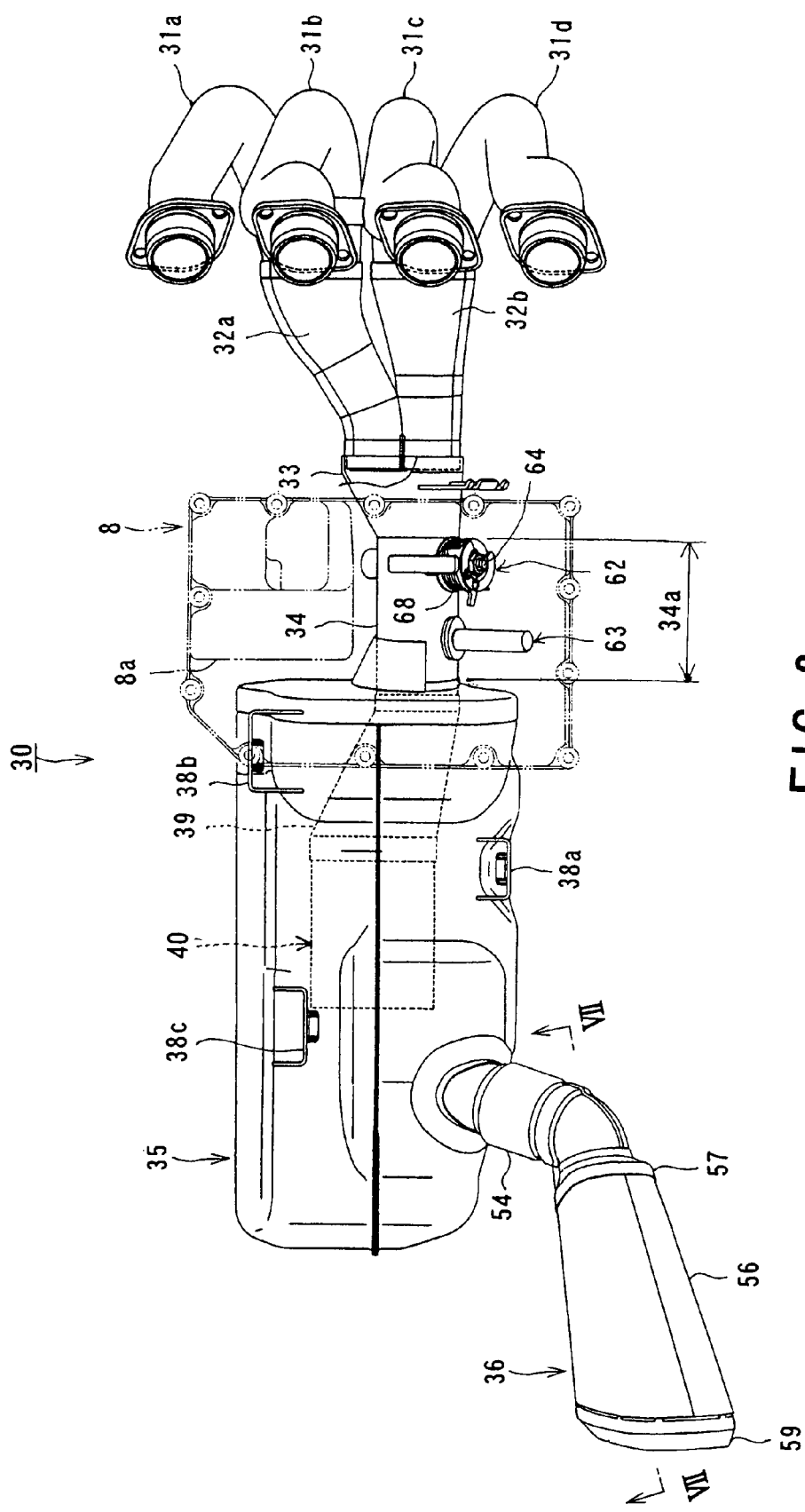
FIG. 3 is a plan view of the exhaust system.

The engine 3 has an exhaust system according to the invention. This exhaust system 30 includes, as shown in FIGS. 2 and 3, first exhaust pipes 31a, 31b, 31c, 31d of the number corresponding to the number of the cylinders of the engine 3 (four in this embodiment), first collecting portions 32a, 32b, a second collecting portion 33, a second exhaust pipe 34, an expansion chamber 35, and an exhaust outlet 36.

Figure 4:
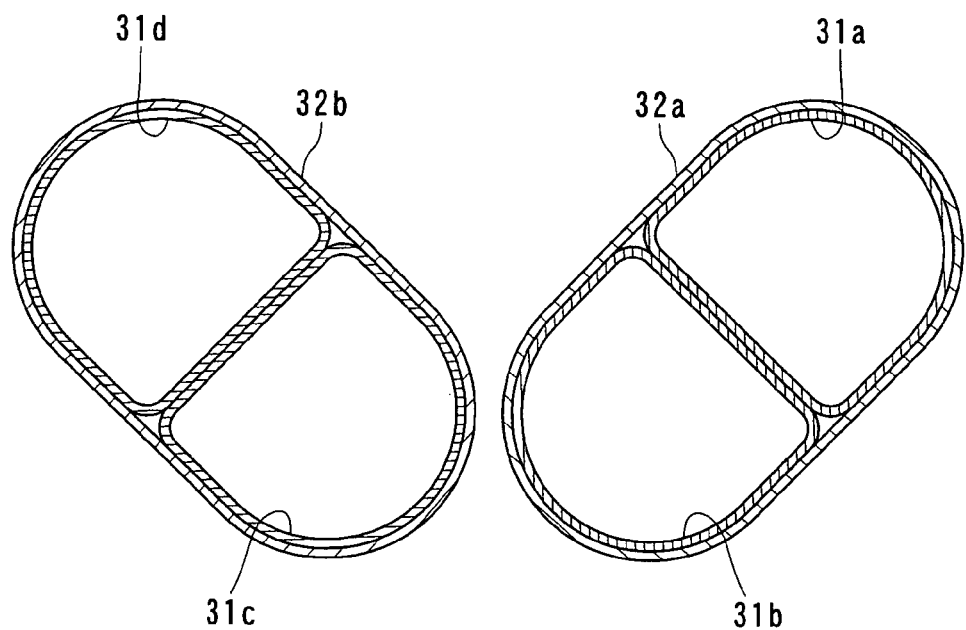
FIG. 4 is a sectional view of a first collecting portion (pipes) taken along the line IV-IV of FIG. 2.
Figure 5:
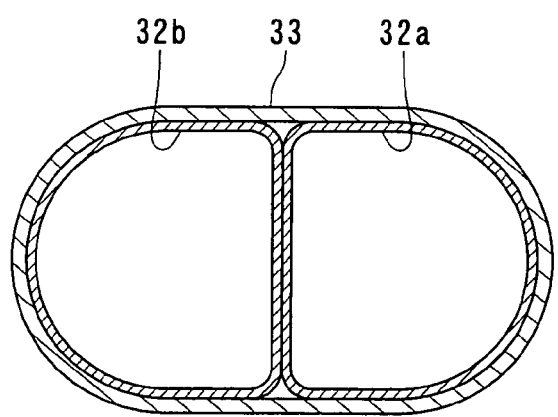
FIG. 5 is a sectional view of a second collecting portion (pipe) taken along the line V-V of FIG. 2.

The first exhaust pipes 31a-31d extends obliquely downward from exhaust ports opened at front side portions of the cylinders 7 of the engine 3, followed by once extending downward and then bending rearward. Then, as also shown in FIG. 4, the first exhaust pipes 31a, 31b are collected to the left-hand first collecting pipe 32a, and the first exhaust pipes 31c, 31d are collected to the right-hand collecting pipe 32b. Further, as also shown in FIG. 5, distal ends of the first collecting portions 32a, 32b are collected to the second collecting portion 33 under the crankcase 6 in front of the oil pan 8, and the second collecting portion 33 is connected to the second exhaust pipe 34 under the crankcase 6 at a downstream side portion thereof.

The second exhaust pipe 34 includes a substantially straight portion 34a passing under the crankcase 6 (i.e. oil pan 8) of the engine 3, and the second exhaust pipe 34 is connected to the expansion chamber 35 at a downstream side thereof. The expansion chamber 35 is arranged behind the oil pan 8 of the engine 3 (downward extending portion 8a described later) under a rear wheel suspension 26 located behind the engine 3 in the side view and fixed to the vehicle body through, for example, three fixing brackets 38a-38c. The expansion chamber 35 is formed in a box-like shape so as to extend both in a longitudinal direction and in a width direction of the vehicle body, and the exhaust outlet portion 36 is coupled to the most downstream side of the expansion chamber 35.

Figure 6:
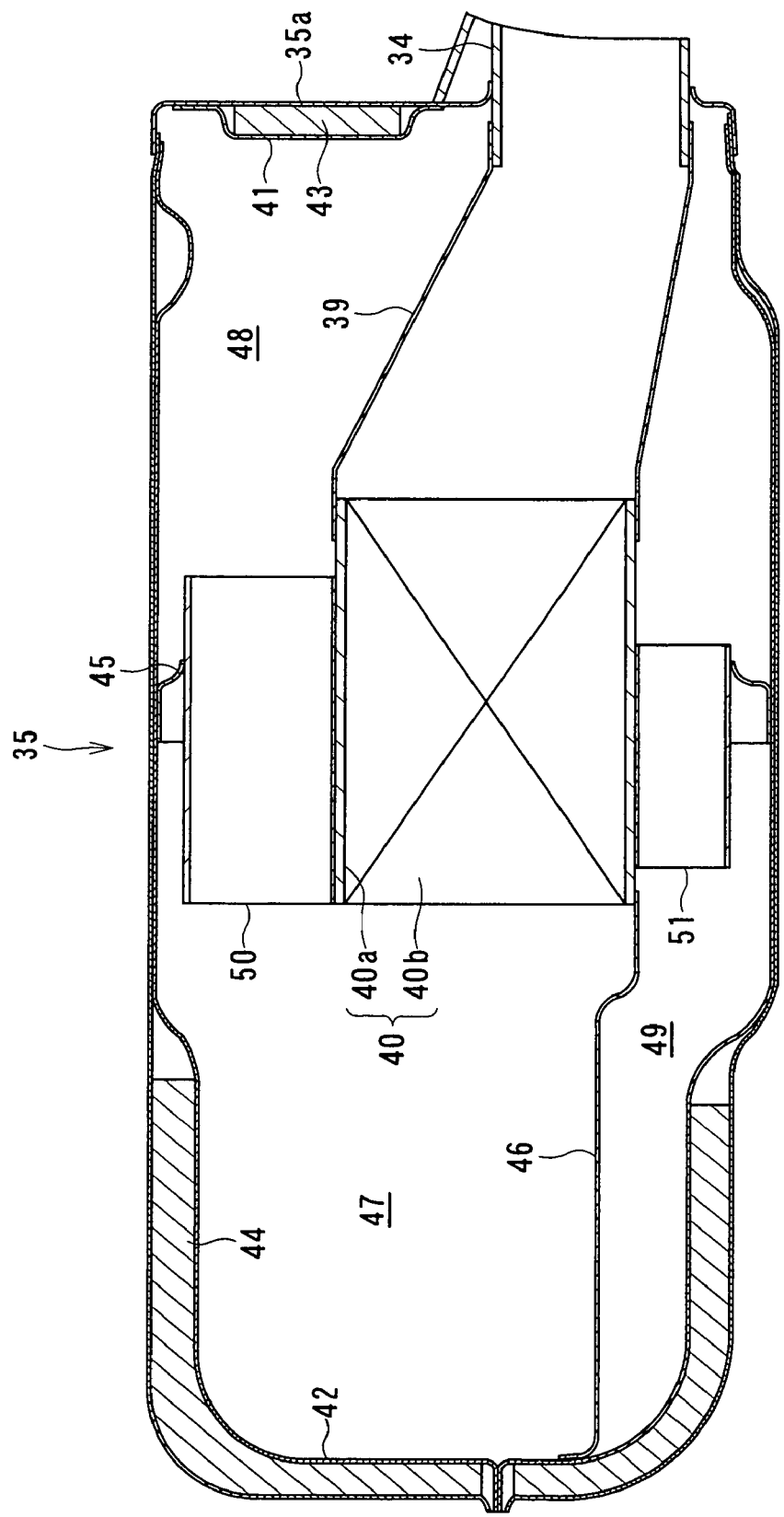
FIG. 6 is a cross sectional view of an expansion chamber taken along the VI-VI of FIG. 2.

As shown in FIG. 6, a rear end portion of the second exhaust pipe 34 penetrates through a front wall 35a of the expansion chamber 35 and enters into the expansion chamber 35, and a megaphone-like expansion pipe 39 expanding, in diameter, rearward is connected to the rear end portion of the second exhaust pipe 34. The expansion pipe 39 has a catalytic converter 40 at a rear end portion thereof. The catalyst 40 includes a straight-like catalyst pipe 40a and a honeycomb catalyst 40b housed in the catalyst pipe 40a, for example.

The front wall 35a and the rear portion of the expansion chamber 35 are of a double walled structure made of perforated punching plate walls 41, 42. Interior of the double walled structure is filled with sound deadening or silencing and heat insulating members 43, 44 such as glass wool. An inside of the expansion chamber 35 is divided into a first expansion chamber 47, a second expansion chamber 48, and a third expansion chamber 49 by a baffle plate 45 and a partition wall 46, and communicating pipes 50 and 51 are fixed to the baffle plate 45 in the penetrating manner. The rear end of the catalyst 40 (the catalyst pipe 40a) opens to the first expansion chamber 47, the first expansion chamber 47 and the second expansion chamber 48 are communicated through the communicating pipe 50, and the second expansion chamber 48 and the third expansion chamber 49 are communicated through the communicating pipe 51.

Figure 7:
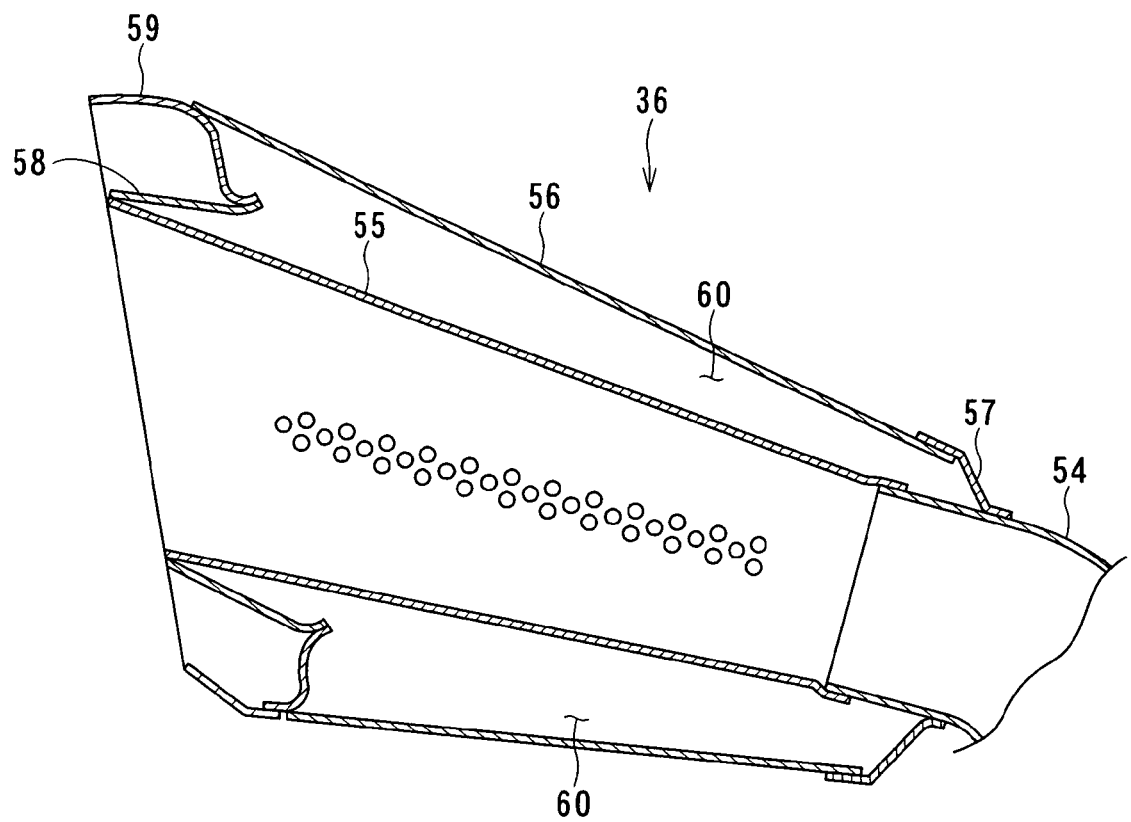
FIG. 7 is a longitudinal sectional view of an exhaust outlet taken along the line VII-VII of FIG. 3.

Then, the exhaust outlet 36 is coupled to the third expansion chamber 49, which is located at the most downstream side of the expansion chamber 35 and arranged on a right side of the rear wheel so as to be overlapped with the front portion of the rear wheel. As shown in FIGS. 2, 3, and 7, the exhaust outlet 36 includes a megaphone pipe-like or perforated punching plate tube 55 coupled to a leading end of the outlet pipe 54 and also includes a megaphone pipe-like diffuser pipe 56 located so as to accommodate the megaphone pipe-like perforated punching plate tube 55 at some interval. A space between the punching plate pipe 55 and the diffuser pipe 56 is closed by cover members 57, 58, 59 at a front end and a rear end of the diffuser pipe, thereby providing a silencing chamber 60.

As shown in FIGS. 1 and 3, the substantially straight portion 34a of the second exhaust pipe 34 is arranged under the oil pan 8 of the engine 3 so as to be offset on one side (for example, right side) in the width direction of the vehicle body. Further, the downward extending portion 8a of the oil pan 8 is arranged on the other side (that is, left side) in the width direction of the vehicle body with respect to the substantially straight portion 34a. Accordingly, the substantially straight portion 34a of the second exhaust pipe 34 overlaps with the downward extending portion 8a of the oil pan 8 in front thereof as viewed from the right side of the vehicle (FIG. 1).

Further, the exhaust throttle valve 62 and the exhaust gas sensor 63 are arranged within a range in which the substantially straight portion 34a overlaps with the downward extending portion 8a. In the arrangement, the exhaust throttle valve 62 is located on an upstream side (on a forward side), and the exhaust gas sensor 63 is located on a downstream side (on a rearward side).

Figure 8:
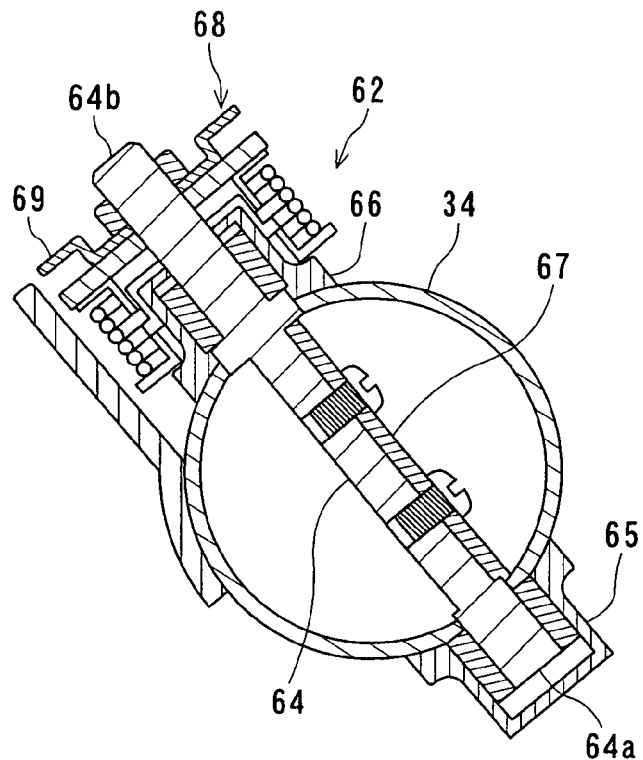
FIG. 8 is a longitudinal sectional view of an exhaust throttle valve taken along the line VIII-VIII of FIG. 2.

As shown in FIGS. 2, 3, and 8, the exhaust throttle valve 62 is inclined in such a manner that a valve shaft 64 is directed along a radial direction of the second exhaust pipe 34, and one end portion 64a of the valve shaft 64 on a side of the downward extending portion 8a of the oil pan is positioned at a level lower than the other end portion 64b as viewed in the axial direction of the second exhaust pipe 34. In this embodiment, the inclination angle of the valve shaft 64 is set to about 45° with respect to the horizontal direction. The valve shaft 64 is provided on bearing portions 65 and 66 fixed to an outer surface of the second exhaust pipe 34.

A circular butterfly 67 is mounted to the valve shaft 64 to be integrally rotatable, and the rotation of the valve shaft 64 causes the butterfly valve 67 to be opened or closed so as to increase or decrease the flow passage area of the second exhaust pipe 34. Further, a driving unit 68 of the exhaust throttle valve 62 is arranged on an outer circumferential surface of the second exhaust pipe 34 on a side opposite to the downward extending portion 8a of the oil pan (on an upper-right side with respect to the width direction of the vehicle body). That is, the driving unit 68 is located on an upper-right surface of the second exhaust pipe 34. The driving unit 68 is provided with a pulley 69, and according to the rotation of the pulley 69 through a wire cable 70 by an actuator, not shown, the butterfly valve 67 is controlled to be opened or closed.

Figure 9:
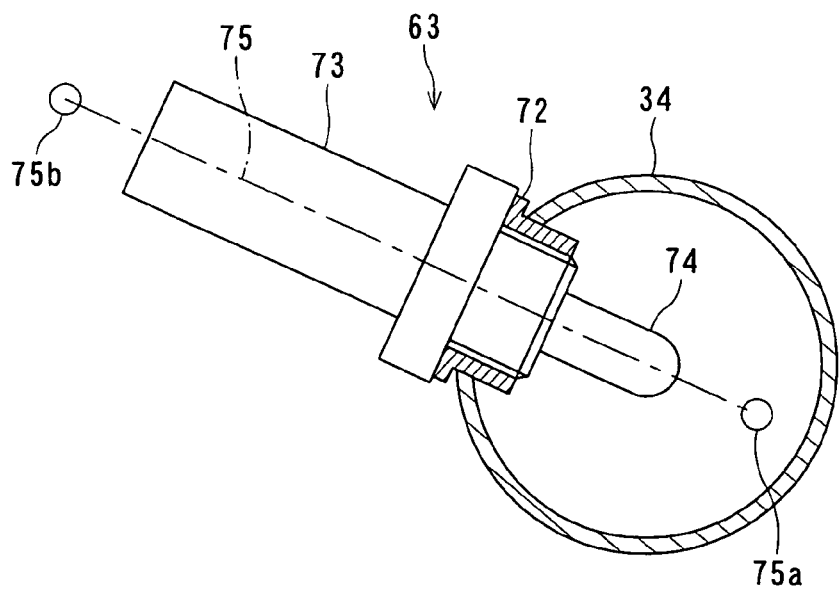
FIG. 9 is a longitudinal sectional view of an exhaust gas sensor taken along the line IX-IX of FIG. 2.

On the other hand, the exhaust gas sensor 63 is constructed, as shown in FIG. 9, in such a manner that a sensor main body 73 is fastened to a sensor nut 72 fixed to the second exhaust pipe 34, and a detecting element 74 disposed on a distal end of the sensor main body 73 enters into the second exhaust pipe 34. The installation axis 75 of the sensor main body 73 is inclined in such a manner that the installation axis 75 is directed along the radial direction of the second exhaust pipe 34. Furthermore, one end portion 75a on a side of the downward extending portion 8a of the oil pan is positioned at a level lower than the other end portion 75b as viewed in the axial direction of the second exhaust pipe 34.

Therefore, the sensor main body 73 is arranged so as to be located on the outer circumferential surface of the second exhaust pipe 34 on a side opposite to the downward extending portion 8a of the oil pan (on an upper-right side with respect to the width direction of the vehicle body). The inclination angle of the exhaust gas sensor 63(73) is about 25° with respect to the horizontal direction. The exhaust gas sensor 63(73) is an $O_2$ sensor, for example, and detects an oxygen concentration in the exhaust gas and transmits the detected data to a CPU of the fuel injector 9. The CPU controls a fuel injection amount of the fuel injector 9 so as to remove unburned components in the exhaust gas.

The exhaust system 30 of the structure mentioned above has the expansion chamber 35 having a large weight arranged at the central portion in the longitudinal direction at a lower position of the vehicle body of the motorcycle. Therefore, it is capable of centralizing the weight distribution of the vehicle body, lowering the gravity center of the vehicle body, and arranging the expansion chamber without impairing the running stability. Further, the expansion chamber 35 is arranged under the rear wheel suspension 26, and the rear wheel suspension 26 can be surely prevented from being damaged due to contact to obstructions on the road and the like.

The exhaust gas sensor 63 is disposed in the second exhaust pipe 34, which is located just at a position downstream of the first collecting portions 32a, 32b and the second collecting portion 33 collecting the first exhaust pipes 31a-31d. The second exhaust pipe 34 thus forms a flow passage in which an exhaust pulsation becomes highest and the exhaust gas from the fist exhaust pipes 31a-31d is uniformly mixed. Accordingly, the components of the exhaust gas can be precisely detected.

Furthermore, since the exhaust gas sensor 63 is located at a location downstream of the exhaust throttle valve 62, the component of the exhaust gas can be effectively detected at a location where the exhaust gas led from the first exhaust pipes 31a-31d is best mixed, and the exhaust gas sensor 63, which may be easily damaged, can be protected by the exhaust throttle valve 62 by blocking splashing stones and the like from the front wheel 19.

In addition, since the exhaust gas sensor 63 is located at a location upstream of the expansion chamber 35, it is capable of detecting the component of the exhaust gas in a high temperature state before the exhaust gas expands and, then falls in temperature, in the expansion chamber 35. Therefore, the detecting performance of the exhaust gas sensor 63 can be improved.

Moreover, it is also capable of operating the exhaust gas sensor 63 upon the starting of the engine and enhancing the operating efficiency of the exhaust gas sensor 63 without being adversely affected by the condensed water condensed in the expansion chamber 35 when the engine 3 is cold, that is, without waiting the warming up of the engine 3. In particular, in a case where the exhaust gas sensor 63 is an $O_2$ sensor, the exhaust gas sensor 63 stops operation due to dewing of the sensor, so that the arrangement of the exhaust gas sensor 63 in the second exhaust pipe 34, which can hardly be condensed, can greatly contribute to the operational advantage.

Still furthermore, since the exhaust throttle valve 62 is disposed in the second exhaust pipe 34 which has a great exhaust pulsation, the operating efficiency of the exhaust throttle valve 62 can be greatly enhanced to realize the sufficient output-increasing effect (torque-up in a medium engine speed range). In addition, since the second exhaust pipe 34 is considerably less in cross sectional area than the expansion chamber 35, the exhaust throttle valve 62 can be miniaturized so as to improve the manufacturability of the exhaust system 30.

On the other hand, the second exhaust gas pipe 34, i.e. substantially straight portion 34*a*, is arranged under the oil pan 8 so as to be offset on one side (right side) in the width direction of the vehicle body, and the downward extending portion 8*a* of the oil pan 8 is arranged on the other side (left side) in the width direction of the vehicle body. Therefore, it is capable of arranging the engine 3 at a possibly lower position with a large capacity of the oil pan being maintained, the gravity center of the vehicle body can be lowered, and the running stability of the motorcycle 1 can be improved.

The exhaust throttle valve 62 and the exhaust gas sensor 63 are arranged within a range in which the substantially straight portion 34*a* overlaps with the downward extending portion 8*a* of the oil pan 8, as seen in the side view, and the expansion chamber 35 is arranged behind the oil pan 8 (downward extending portion 8*a*). Therefore, the exhaust throttle valve 62 and the exhaust gas sensor 63 can be guarded by the downward extending portion 8*a* and the expansion chamber 35 and hence protected from the splashing water, stones and the like. Further, the downward extending portion 8*a* and the second exhaust pipe 34 (substantially straight portion 34*a*) may be arranged reversely in the left and right directions.

In this exhaust system 30, since the expansion chamber 35 is arranged behind the oil pan 8 (the downward extending portion 8*a*), the expansion chamber 35 can be enlarged both in the longitudinal direction and in the width direction of the vehicle body to thereby increase the capacity of the chamber while effectively utilizing a rear space of the oil pan 8. Thus, the silencing performance of the expansion chamber 35 can be improved.

Furthermore, the exhaust throttle valve 62 is inclined in such a manner that the valve shaft 64 is directed along the radial direction of the second exhaust pipe 34, and one end portion 64*a* of the valve shaft 64 on an inward side in the width direction of the vehicle body (on a side of the downward extending portion 8*a* of the oil pan) is positioned at a level lower than the other end portion 64*b* on an outward side in the width direction of the vehicle body (on an opposite side to the downward extending portion 8*a* of the oil pan with respect to the second exhaust pipe 34). The exhaust gas sensor 63 is inclined in such a manner that the installation axis 75 is directed along the radial direction of the second exhaust pipe 34, and one end portion 75*a* of the installation axis 75 on an inward side in the width direction of the vehicle body (on a side of the downward extending portion 8*a* of the oil pan) is positioned at a level lower than the other end portion 75*b* on an outward side in the width direction of the vehicle body (on an opposite side to the downward extending portion 8*a* of the oil pan with respect to the second exhaust pipe 34). Accordingly, the exhaust throttle valve 62 and the exhaust gas sensor 63 can be arranged with decreasing projecting lengths to an outward side of the width direction of the vehicle body.

In addition, the driving unit 68 of the exhaust throttle valve 62 and the sensor main body 73 of the exhaust gas sensor 63 are arranged on the outer circumferential surface of the second exhaust pipe 34 on the side opposite to the downward extending portion 8*a* of the oil pan, so that the maintenance workability can be largely improved, such as overhaul, cleaning, and replacement working.

Still furthermore, since the heavy catalyst 40 is installed inside the heavy expansion chamber 35, it is capable of increasingly centralizing the weight distribution of the vehicle body and lowering the gravity center of the vehicle body so as to maintain the good running stability.

It is further to be noted that the present invention is not limited to the described embodiment and many other changes and modifications may be made without departing from the scopes of the appended claims.

What is claimed is:

1. An exhaust system for a motorcycle having an engine mounted on a front half of a body frame of the motorcycle in a longitudinal direction thereof, the exhaust system comprising:
   a plurality of first exhaust pipes extending from exhaust ports of the engine;
   a collecting section at which the first exhaust pipes are collected together;
   a second exhaust pipe including a substantially straight portion connected to a downstream side of the collecting section and disposed under a crankcase of the engine;
   an expansion chamber connected to a downstream side of the second exhaust pipe at a front portion thereof and located under a rear wheel suspension arranged behind the engine as seen in a side view of the motorcycle body; and
   an exhaust outlet disposed on a most downstream portion of the expansion chamber;
   wherein the expansion chamber is disposed behind a downward extending portion of an oil pan arranged at a bottom portion of the crankcase,
   the substantially straight portion is disposed below the oil pan so as to be offset from the downward extending portion in a width direction of the vehicle,
   an exhaust throttle valve and an exhaust gas sensor are disposed on the substantially straight portion, and
   the exhaust throttle valve is disposed on an upstream side of the exhaust gas sensor, and a valve shaft of the exhaust throttle valve and a detecting element of the exhaust gas sensor are overlapped with each other as viewed in an axial direction of the second exhaust pipe.

2. The exhaust system for a motorcycle according to claim 1, wherein a catalytic converter is provided in the expansion chamber.

3. The exhaust system for a motorcycle according to claim 1, wherein the exhaust throttle valve is arranged in a manner that a valve shaft thereof is directed along a radial direction of the second exhaust pipe, one end portion of the valve shaft on a side of the downward extending portion of the oil pan is positioned at a level lower than another end portion of the valve shaft, and the exhaust throttle valve has a driving portion located on an outer circumferential surface of the second exhaust pipe on a side opposite to the downward extending portion of the oil pan, and wherein the exhaust gas sensor is arranged in a manner that an installation axis thereof is directed along the radial direction of the second exhaust pipe, one end portion of the installation axis on a side of the downward extending portion of the oil pan is positioned at a level lower than another end of the installation axis, and the exhaust gas sensor has a sensor main body located on the outer circumferential surface of the exhaust pipe on a side opposite to the downward extending portion of the oil pan.

4. The exhaust system for a motorcycle according to claim 3, wherein the exhaust throttle valve includes a driving unit which is arranged on an outer circumferential surface of the second exhaust pipe on a side opposite to the downward extending portion of the oil pan.

5. An exhaust system for a motorcycle having an engine mounted on a front half of a body frame of the motorcycle in a longitudinal direction thereof, the exhaust system comprising:
- a plurality of first exhaust pipes extending from exhaust ports of an engine;
- a collecting section at which the first exhaust pipes are collected together;
- a second exhaust pipe including a substantially straight portion connected to a downstream side portion of the collecting section and disposed under a crankcase of the engine;
- an expansion chamber connected to a downstream side of the second exhaust pipe at a front portion thereof; and
- an exhaust outlet disposed on the most downstream portion of the expansion chamber,
- wherein the expansion chamber is disposed behind a downward extending portion of an oil pan arranged at a bottom portion of the crankcase,
- the substantially straight portion of the second exhaust pipe is arranged under an oil pan of the engine so as to be offset from the downward extending portion in a width direction of the vehicle,
- an exhaust throttle valve and an exhaust gas sensor are disposed within a range in which the substantially straight portion of the second exhaust pipe overlaps with the downward extending portion of the oil pan, and
- the exhaust throttle valve is disposed on an upstream side of the exhaust gas sensor, and a valve shaft of the exhaust throttle valve and a detecting element of the exhaust gas sensor are overlapped with each other as viewed in an axial direction of the second exhaust pipe.

6. The exhaust system for a motorcycle according to claim 5, wherein a catalytic converter is provided in the expansion chamber.

7. The exhaust system for a motorcycle according to claim 5, wherein the exhaust throttle valve is arranged in a manner that a valve shaft thereof is directed along a radial direction of the second exhaust pipe, one end portion of the valve shaft on a side of the downward extending portion of the oil pan is positioned at a level lower than another end portion of the valve shaft, and the exhaust throttle valve has a driving portion located on an outer circumferential surface of the second exhaust pipe on a side opposite to the downward extending portion of the oil pan, and wherein the exhaust gas sensor is arranged in a manner that an installation axis thereof is directed along the radial direction of the second exhaust pipe, one end portion of the installation axis on a side of the downward extending portion of the oil pan is positioned at a level lower than another end of the installation axis, and the exhaust gas sensor has a sensor main body located on the outer circumferential surface of the exhaust pipe on a side opposite to the downward extending portion of the oil pan.

8. The exhaust system for a motorcycle according to claim 7 wherein the exhaust throttle valve includes a driving unit which is arranged on an outer circumferential surface of the second exhaust pipe on a side opposite to the downward extending portion of the oil pan.

* * * * *